(12) United States Patent
Ortiz

(10) Patent No.: US 9,004,537 B1
(45) Date of Patent: Apr. 14, 2015

(54) REGAL PUSH CARRIAGE FOR CHILDREN

(71) Applicant: Crystal La Mora Ortiz, Oceanside, CA (US)

(72) Inventor: Crystal La Mora Ortiz, Oceanside, CA (US)

( * ) Notice: Subject to any disclaimer, the term of this patent is extended or adjusted under 35 U.S.C. 154(b) by 0 days.

(21) Appl. No.: 14/143,236

(22) Filed: Dec. 30, 2013

(51) Int. Cl.
*A63G 31/00* (2006.01)
*B62B 9/10* (2006.01)
*B62B 7/04* (2006.01)

(52) U.S. Cl.
CPC .... *B62B 9/10* (2013.01); *B62B 7/04* (2013.01)

(58) Field of Classification Search
CPC .................................. B62B 7/04; B62B 9/10
USPC ............. 280/827, 829, 1.12, 1.13, 1.16, 1.21, 280/1.22; 446/411, 431, 450, 451
See application file for complete search history.

(56) References Cited

U.S. PATENT DOCUMENTS

| | | | | |
|---|---|---|---|---|
| 4,219,962 A * | 9/1980 | Dankman et al. | ............. | 446/409 |
| 6,645,037 B1 * | 11/2003 | Choi | ............................. | 446/436 |
| 6,758,718 B1 * | 7/2004 | Morris | .......................... | 446/431 |
| 8,764,511 B2 * | 7/2014 | Verbera et al. | ................. | 446/465 |
| 2013/0193097 A1 * | 8/2013 | Pritchett-Brown | .......... | 211/85.2 |

* cited by examiner

*Primary Examiner* — Hau Phan
*Assistant Examiner* — Jacob Meyer
(74) *Attorney, Agent, or Firm* — Williams Intellectual Property; Benjamin F. Williams

(57) ABSTRACT

A regal push carriage for children including a cart ornamented with a crown atop an attachable roof and a plurality of decorative fleurons disposed upon the cart. A plurality of Light Emitting Diodes is disposed to illumine within the crown and the plurality of decorative fleurons when activated by depression of a switch member, wherein said plurality of Light Emitting Diodes scintillates and sparkles against a plurality of reflective elements disposed integral with the crown and plurality of decorative fleurons, thereby reminiscent of jewels and precious stones, whereby the appearance of traveling royalty is impressible to passersby.

Figure 1:
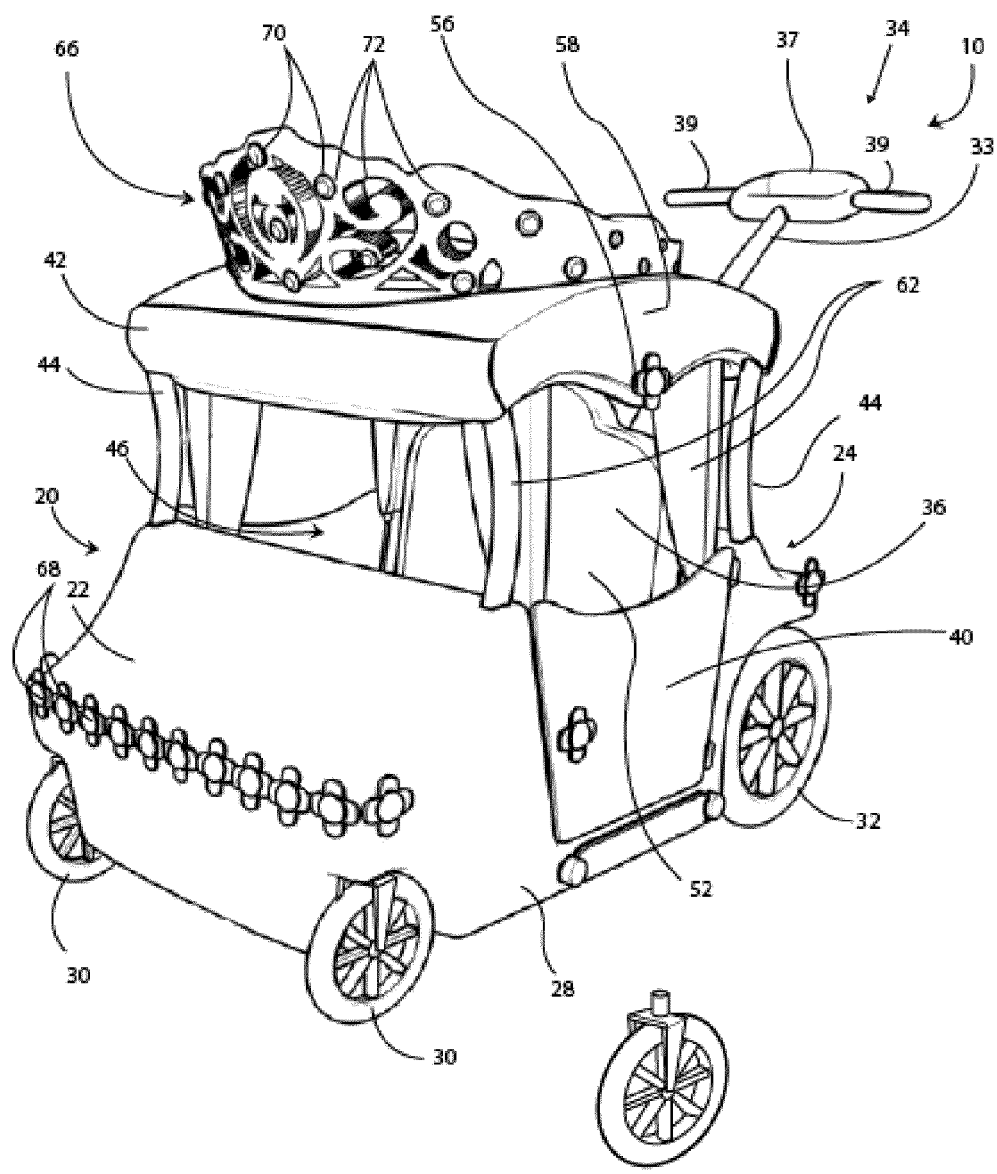

15 Claims, 4 Drawing Sheets

REGAL PUSH CARRIAGE FOR CHILDREN

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of push carriages and strollers for children are known in the prior art. However, what is needed is a regal push carriage for children that includes a cart ornamented with a crown, disposed atop an attachable roof, and a plurality of decorative fleurons disposed upon the cart. A plurality of Light Emitting Diodes is disposed to illumine within the crown and the plurality of decorative fleurons when activated by depression of a switch member, wherein said plurality of Light Emitting Diodes scintillates and sparkles against a plurality of reflective elements disposed integral to the crown and plurality of decorative fleurons, thereby reminiscent of jewels and precious stones, whereby the appearance of traveling royalty is impressible to passersby.

FIELD OF THE INVENTION

The present invention relates to a regal push carriage for children, and more particularly, to a regal push carriage for children that includes a cart ornamented with a crown, disposed atop an attachable roof, and a plurality of decorative fleurons, disposed upon the cart. A plurality of Light Emitting Diodes is disposed to illumine within the crown and the plurality of decorative fleurons when activated by depression of a switch member, wherein said plurality of Light Emitting Diodes scintillates and sparkles against a plurality of reflective elements disposed integral with the crown and plurality of decorative fleurons, thereby reminiscent of jewels and precious stones, whereby the appearance of traveling royalty is impressible to passersby.

SUMMARY OF THE INVENTION

The general purpose of the regal push carriage for children, described subsequently in greater detail, is to provide a regal push carriage for children which has many novel features that result in a regal push carriage for children which is not anticipated, rendered obvious, suggested, or even implied by prior art, either alone or in combination thereof.

The present regal push carriage for children has been devised as a fun mode of transportation for young children, reminiscent of a royal or fairytale carriage. The regal push carriage for children includes a cart ornamented with a crown atop an attachable roof, said crown including a plurality of Light Emitting Diodes ("LEDs") disposed to illumine when activated by depression of a switch member, wherein said plurality of LEDs scintillates and sparkles against a plurality of reflective elements disposed integral with the crown, thereby reminiscent of jewels and precious stones, whereby the appearance of traveling royalty is impressible to passersby.

The present regal push carriage for children, therefore, includes a cart having a front side, a rear side, a left side, and a right side. A pair of front wheels is volubly disposed to contact the ground proximal the front side and a pair of rear wheels is volubly disposed to contact the ground proximal the rear side. In the preferred embodiment herein disclosed, each of the pair of rear wheels has a diameter greater than the diameter of each of the pair of front wheels. Each of the pair of front wheels is contemplated to be vertically rotational through 360 degrees, whereby increased maneuverability of the cart is effective.

For directional manipulation of the cart, a telescopic handle is disposed upon the rear side, the telescopic handle including a projecting shaft and a handle crosspiece. The projecting shaft is height adjustable, and securable at a desired height for use by a particular user, by a plurality of ball detents. The handle crosspiece is disposed perpendicularly endwise atop the projecting shaft and enables a point of purchase to directionally move the cart. The crosspiece further includes a pair of cup holders therein whereby a pair of cups, or other drink containers, is positional when pushing the regal carriage for children.

A seat member is disposed interior to the cart, whereon at least one child may sit in comfort. A rear-hinged left door is disposed on the cart left side and a rear-hinged right door is disposed on the cart right side, whereby access to the seat member is enabled.

An attachable roof is included, securable to the cart to overlie the seat member. The attachable roof includes a plurality of strut members, each of said plurality of strut members vertically delimiting a front window, disposed overlooking the cart front side, a rear window disposed overlooking the rear side, a left window disposed overlooking the left side, and a right window disposed overlooking the right side.

A first lobed lintel is disposed overlying the left window, said first lobed lintel having a fleuron disposed at a cusp thereof. A second lobed lintel is disposed overlying the right window, said second lobed lintel likewise having a fleuron disposed at a cusp thereof.

A first pair of curtains is disposed depending from the roof to obscure the left window when said first pair of curtains is drawn closed. A second pair of curtains is disposed depending from the roof to obscure the right window when said second pair of curtains is drawn closed. Thus, a child riding in the carriage may obscure each of the left and right window, as desired, and increase privacy during travel.

An elastomeric net pocket is disposed on the rear side proximal the telescopic handle. The elastomeric net pocket is usable for storage of articles and accouterments therein, said articles and accouterments thereby maintained accessible to a person pushing the cart and a child riding in the cart.

An ornamental crown is disposed atop the roof and a plurality of decorative elements is disposed upon the cart front side, rear side, left side, and right side. The ornamental crown is oversized to occupy a substantial portion of the roof and to be visible thereat. A plurality of LEDs is disposed upon the ornamental crown and among the plurality of decorative elements, said plurality of LEDs disposed thereat to illumine and scintillate and sparkle against a plurality of reflective elements disposed in the crown and decorative elements reminiscent of jewels and precious stones. In the preferred embodiment herein disclosed, the plurality of decorative elements is a plurality of fleurons.

A switch member is disposed in the cart rear side, proximal the telescopic handle. The switch member is depressible to activate the plurality of LEDs to illumine and scintillate and sparkle in the crown and among the plurality of fleurons, whereby the majesty of the regal push carriage for children is perceptible and the impression of royalty traveling is impressible upon passersby.

A rechargeable battery is disposed within the cart to power the plurality of LEDs when the switch member is activated. The rechargeable battery may be rechargeable by interconnection with an external power supply by means of an attachable power cord.

Thus has been broadly outlined the more important features of the present regal push carriage for children so that the detailed description thereof that follows may be better understood and in order that the present contribution to the art may be better appreciated.

Objects of the present regal push carriage for children, along with various novel features that characterize the invention are particularly pointed out in the claims forming a part of this disclosure. For better understanding of the regal push carriage for children, its operating advantages and specific objects attained by its uses, refer to the accompanying drawings and description.

BRIEF DESCRIPTION OF THE DRAWINGS FIGURES

Figure 2:
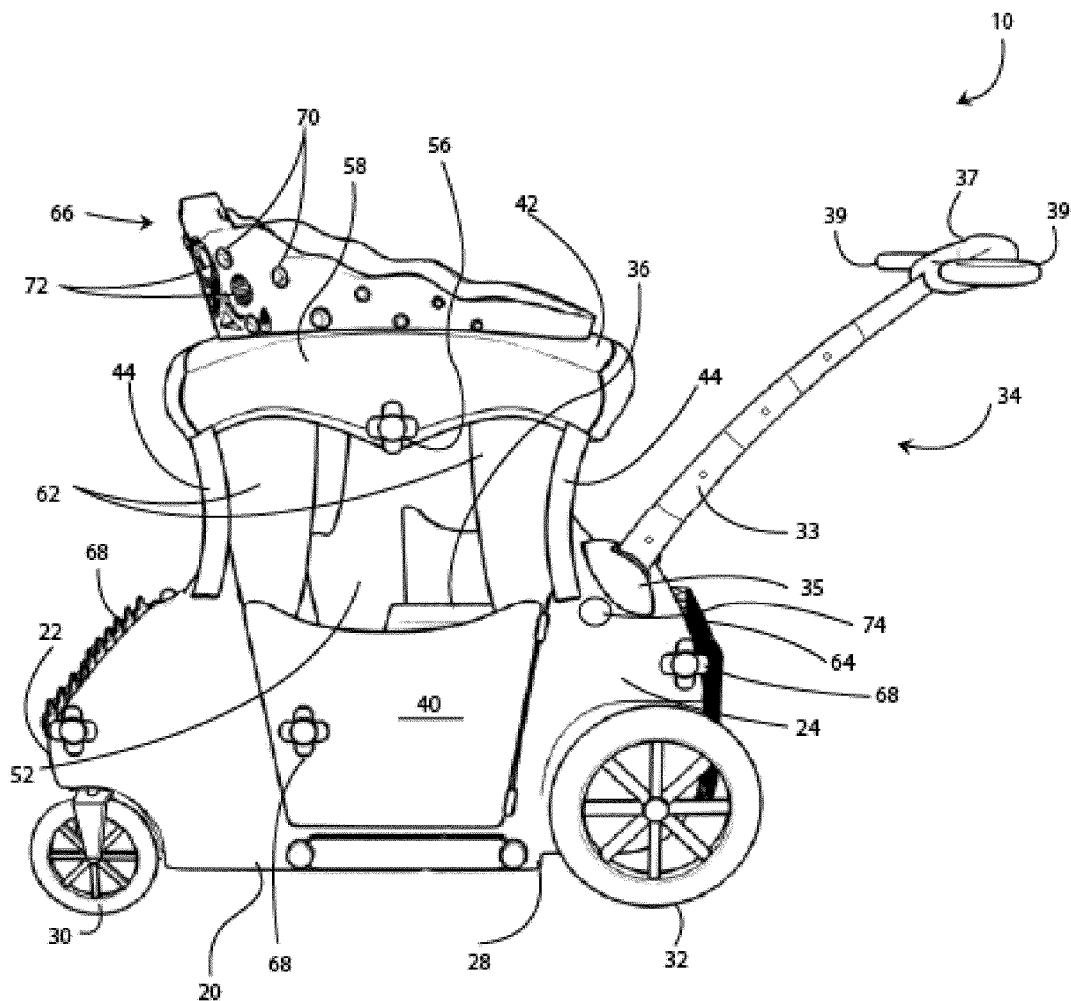
Figure 3:
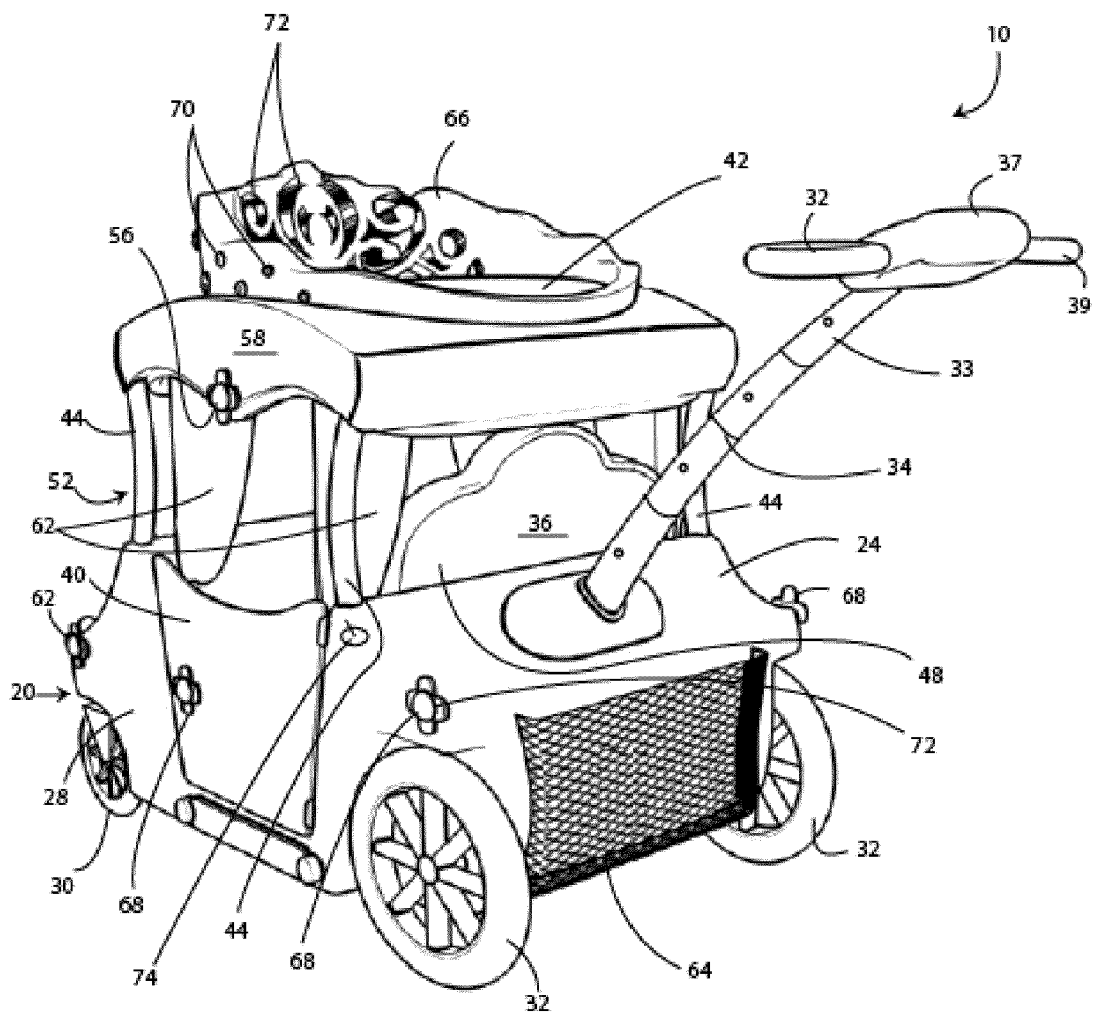
Figure 4:
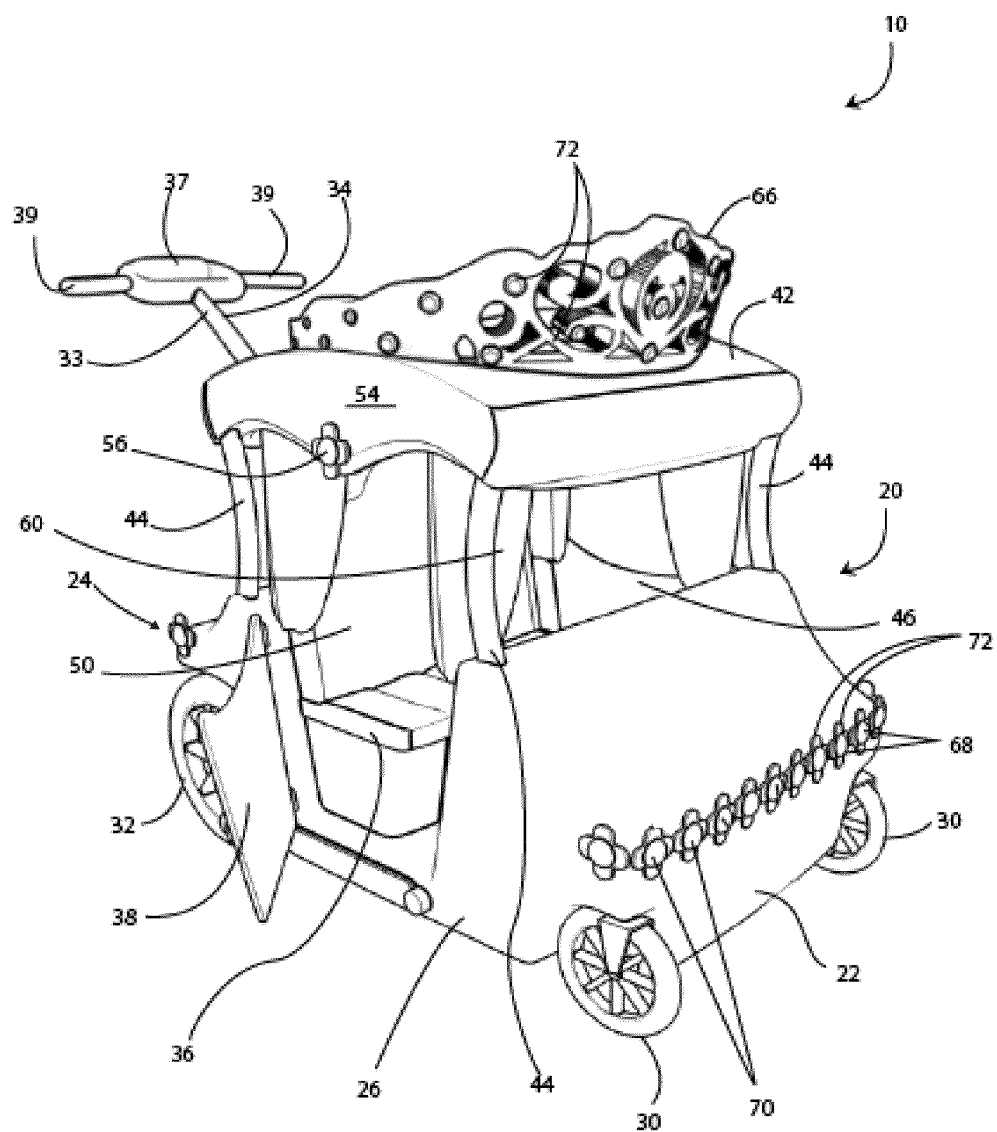

FIG. 1 is an isometric view.
FIG. 2 is a right side view.
FIG. 3 is a rear side isometric view.
FIG. 4 is a left side isometric view.

DETAILED DESCRIPTION OF THE DRAWINGS

With reference now to the drawings, and in particular FIGS. 1 through 4 thereof, example of the instant regal push carriage for children employing the principles and concepts of the present regal push carriage for children and generally designated by the reference number 10 will be described.

Referring to FIGS. 1 through 4 a preferred embodiment of the present regal push carriage for children 10 is illustrated.

The present regal push carriage for children 10 has been devised to enable a fun means of travel for a child in a cart reminiscent of a royal litter or carriage, whereby a child is travelable by a person pushing said cart and the appearance of traveling royalty is impressible upon passersby.

The present regal push carriage for children 10, therefore, includes a cart 20 having a front side 22, a rear side 24, a left side 26, and a right side 28. A pair of front wheels 30 is volubly disposed to contact the ground proximal the cart 20 front side 22 and a pair of rear wheels 32 is volubly disposed to contact the ground proximal the cart 20 rear side 24. Each of the pair of rear wheels 32 has a diameter longer than a diameter of each of the pair of front wheels 30. Additionally, each of the pair of front wheels 30 is disposed rotational around a vertical axis, whereby maneuverability of the cart 20 is effected.

A telescopic handle 34 is disposed upon the rear side 24. The telescopic handle 34 is adjustable to conform to a height of a person pushing the cart 20 and securable at selected heights by means of a plurality of ball detents. The telescopic handle 34 is contemplated to be attachable to the cart 20 rear side 24 at a handle mount 35 there disposed. The telescopic handle 34 includes a projecting shaft 33 and a crosspiece 37 perpendicularly disposed endwise thereatop. The crosspiece 37 enables a point of purchase when directing the cart 20 and includes a pair of cup holders 39 wherein extant containers are portable when pushing the cart 20.

A seat member 36 is disposed interior to the cart 20, the seat member 36 disposed for comfortable disposition of a child seated thereon while traveling in the cart 20. For access to the seat member 36 and the cart 20 interior, a rear-hinged left door 38 disposed in the cart 20 left side 26 and a rear-hinged right door 40 disposed in the right side 28.

An attachable roof 42 is connectable to the cart 20 and supportable over the seat member 36. The attachable roof 42 includes a plurality of vertically oriented strut members 44 whereby the roof 42 is supportable over the seat member 36. The plurality of strut members 44 and roof 42 delimit a front window 46 above the front side 22, a rear window 48 above the rear side 24, a left window 50 above the left door 38, and a right window 52 above the right door 40, through which front, rear, left, and right windows a field of view from the cart 20 is enabled.

A first lobed lintel 54 is disposed above the left window 50, said first lobed lintel 54 including a fleuron disposed at a cusp 56 thereof. A second lobed lintel 58 is disposed above the right window 52, said second lobed lintel 58 including a fleuron disposed at a cusp 56 thereof.

A first pair of curtains 60 is disposed interiorly depending from the roof 42 upon the cart 20 left side 26 and a second pair of curtains 62 is interiorly disposed depending from the roof 42 upon the cart 20 right side 28. The first pair of curtains 60 is thereat closeable to obscure the left window 50, and the second pair of curtains 62 is closeable to obscure the right window 52.

An elastomeric net pocket 64 is disposed upon the cart 20 rear side 24 proximal the telescopic handle 34. The net pocket 64 is disposed thereat for storage of accouterments and articles therein accessible to a person pushing the cart 20 or a child riding in the cart 20.

An ornamental crown 66 is disposed atop the roof 42 and a plurality of decorative elements 68 is disposed upon the cart 20 front side 22, rear side 24, left side 26, and right side 28. A plurality of LEDs 70 is disposed decoratively in the ornamental crown 66 and integral with the plurality of decorative elements 68, each of said plurality of LEDs 70 illuminable to scintillate and sparkle against a plurality of reflective elements 72 disposed in the ornamental crown 66 and plurality of decorative elements 68 and thereby reminiscent of jewels and precious stones. In the preferred embodiment herein disclosed, the plurality of decorative elements is plurality of fleurons.

A switch member 74, disposed proximal the telescopic handle 34, is depressible to activate the plurality of LEDs 70 whereby the scintillating and sparkling of the ornamental crown 66 and plurality of decorative fleurons 68 is enabled.

The telescopic handle 34, therefore, enables directional manipulation of the cart 20 and a child is thereby travelable within the cart 20 under the direction of a person pushing said cart 20 and each of the plurality of LEDs 70 is illuminable to scintillate and sparkle in the ornamental crown 66 and the plurality of decorative fleurons 68, whereby the appearance of traveling royalty is impressible to passersby.

What is claimed is:

1. A regal push carriage for children comprising a cart ornamented with a crown atop an attachable roof, said crown including a plurality of Light Emitting Diodes disposed to illumine when activated by depression of a switch member, wherein said plurality of Light Emitting Diodes scintillate and sparkle against a plurality of reflective elements disposed integral with said crown reminiscent of jewels and precious stones, whereby the appearance of traveling royalty is impressible to passersby.

2. The regal push carriage for children of claim 1 wherein the cart comprises:
   a front side, a rear side, a left side, and a right side;
   a telescopic handle disposed projecting from the rear side, said telescopic handle adjustably extensible for directional manipulation of the cart by users of different heights;
   a pair of front wheels volubly disposed to contact the ground proximal the front side;
   a pair of rear wheels volubly disposed to contact the ground proximal the rear side;
   a seat member disposed interior to the cart, said seat member supportive of a child seated thereon;
   a rear-hinged left door disposed in the left side;
   a rear-hinged right door disposed in the right side;
   a plurality of decorative elements exteriorly disposed thereon; and
   a plurality of Light Emitting Diodes disposed integral with the plurality of decorative elements.

3. The regal push carriage for children of claim 2 wherein the roof is attachable to the cart and supportable upon a plurality of strut members, wherein the plurality of strut members and roof delimit a front window disposed above the cart front side, a rear window disposed above the cart rear side, a left window disposed above the left door, and a right window disposed above the right door.

4. The regal push carriage for children of claim 3 wherein a first pair of curtains is dispositional to obscure the left window and a second pair of curtains is dispositional to obscure the right window.

5. The regal push carriage for children of claim 4 wherein the telescopic handle includes a projecting shaft and a crosspiece, said crosspiece disposed perpendicularly endwise atop the projecting shaft.

6. The regal push carriage for children of claim 5 wherein the crosspiece includes a pair of cup holders wherein extant containers are portable.

7. A regal push carriage for children comprising:
   a cart having a front side, a rear side, a left side, and a right side;
   a pair of front wheels volubly disposed to contact the ground proximal the cart front side;
   a pair of rear wheels volubly disposed to contact the ground proximal the cart rear side;
   a telescopic handle disposed upon the rear side, said telescopic handle adjustably extensible to conform to a height of a person pushing the cart, said telescopic handle including a projecting shaft member and a crosspiece perpendicularly disposed endwise atop the projecting shaft;
   a pair of cup holders disposed upon the crosspiece;
   a seat member disposed interior to the cart;
   a left door disposed in the left side;
   a right door disposed in the right side;
   an attachable roof connectable to the cart, said roof including a plurality of vertically oriented strut members supportable of the roof over the seat member, said plurality of strut members and roof delimiting a front window above the front side, a rear window above the rear side, a left window above the left door, and a right window above the right door;
   a first pair of curtains disposed depending from the roof upon the cart left side, said first pair of curtains closeable to obscure the left window;
   a second pair of curtains disposed depending from the roof upon the cart right side, said second pair of curtains closeable to obscure the right window;
   an ornamental crown disposed atop the roof, said ornamental crown including a plurality of Light Emitting Diodes disposed decoratively therein, each of said plurality of Light Emitting Diodes illuminable to sparkle against a plurality of reflective elements disposed in the ornamental crown reminiscent of jewels and precious stones; and
   a plurality of decorative elements disposed upon the cart front side, rear side, left side, and right side of the cart;
   wherein the telescopic handle enables directional manipulation of the cart and a child is thereby travelable within the cart under the direction of a person pushing said cart and each of the plurality of Light Emitting Diodes is illuminable to scintillate and sparkle in the ornamental crown, whereby the appearance of traveling royalty is impressible to passersby.

8. The regal push carriage for children of claim 7 wherein each of the left door and right door are disposed to open rearwards.

9. The regal push carriage for children of claim 8 wherein the plurality of Light Emitting Diodes is illuminable by depression of a switch member disposed proximal the telescopic handle.

10. The regal push carriage for children of claim 9 wherein the pair of rear wheels have a diameter greater in length than a diameter of the pair of front wheels.

11. The regal push carriage for children of claim 10 wherein the roof includes a first lobed lintel disposed above the left window and a second lobed lintel disposed above the right window, each of said lobed lintels including a fleuron disposed at a cusp thereof.

12. The regal push carriage of claim 11 wherein a plurality of Light Emitting Diodes are further disposed upon the cart integral with the plurality of decorative elements.

13. The regal push carriage of claim 12 wherein the plurality of decorative elements is a plurality of fleurons.

14. The regal push carriage of claim 13 further including an elastomeric net pocket disposed upon the cart rear side, said net pocket disposed for storage of accouterments and articles therein.

15. A regal push carriage for children comprising:
   a cart having a front side, a rear side, a left side, and a right side;
   a pair of front wheels volubly disposed to contact the ground proximal the cart front side;
   a pair of rear wheels volubly disposed to contact the ground proximal the cart rear side, each of said pair of rear wheels having a diameter longer than a diameter of each of the pair of front wheels;
   a telescopic handle disposed upon the rear side, said telescopic handle adjustably extensible to conform to a height of a person pushing the cart, said telescopic handle having a projecting shaft and a crosspiece perpendicularly disposed endwise atop the projecting shaft;
   a pair of cup holders disposed upon the crosspiece;
   a seat member disposed interior to the cart;
   a rear-hinged left door disposed in the left side;
   a rear-hinged right door disposed in the right side;
   an attachable roof connectable to the cart, said roof including a plurality of vertically oriented strut members supportable of the roof over the seat member, said plurality of strut members and roof delimiting a front window above the front side, a rear window above the rear side, a left window above the left door, and a right window above the right door;

a first lobed lintel disposed above the left window, said first lobed lintel including a fleuron disposed at a cusp thereof;
a second lobed lintel disposed above the right window, said second lobed lintel including a fleuron disposed at a cusp thereof;
a first pair of curtains disposed depending from the roof upon the cart left side, said first pair of curtains closeable to obscure the left window;
a second pair of curtains disposed depending from the roof upon the cart right side, said second pair of curtains closeable to obscure the right window;
an ornamental crown disposed atop the roof;
an elastomeric net pocket disposed upon the cart rear side, said net pocket disposed for storage of accouterments and articles therein;
a plurality of decorative fleurons disposed upon the cart front side, rear side, left side, and right side, and upon the roof above at least each of the left window and right window;
a plurality of Light Emitting Diodes disposed decoratively in the ornamental crown and integral with the plurality of decorative fleurons, each of said plurality of Light Emitting Diodes illuminable to scintillate and sparkle against a plurality of reflective elements disposed in the ornamental crown and plurality of fleurons, thereby reminiscent of jewels and precious stones; and
a switch member disposed proximal the telescopic handle, said switch member depressible to activate the plurality of Light Emitting Diodes;
wherein the telescopic handle enables directional manipulation of the cart and a child is thereby travelable within the cart under the direction of a person pushing said cart and each of the plurality of Light Emitting Diodes is illuminable to scintillate and sparkle in the ornamental crown and the plurality of decorative fleurons, whereby the appearance of traveling royalty is impressible to passersby.

* * * * *